(12) United States Patent
Leborys (10) Patent No.: US 10,789,583 B2
(45) Date of Patent: Sep. 29, 2020

(54) DOUBLE SCREEN APPARATUS

(71) Applicant: Ryan Wilson Leborys, Baltimore, MD (US)

(72) Inventor: Ryan Wilson Leborys, Baltimore, MD (US)

( * ) Notice: Subject to any disclaimer, the term of this patent is extended or adjusted under 35 U.S.C. 154(b) by 21 days.

(21) Appl. No.: 16/100,015

(22) Filed: Aug. 9, 2018

(65) Prior Publication Data
US 2019/0050840 A1 Feb. 14, 2019

Related U.S. Application Data

(60) Provisional application No. 62/543,138, filed on Aug. 9, 2017.

(51) Int. Cl.
| | |
|---|---|
| G06Q 20/22 | (2012.01) |
| G06Q 20/30 | (2012.01) |
| G07G 1/01 | (2006.01) |
| G06F 3/14 | (2006.01) |
| G07G 1/00 | (2006.01) |

(52) U.S. Cl.
CPC ........... *G06Q 20/22* (2013.01); *G06F 3/1431* (2013.01); *G06Q 20/30* (2013.01); *G07G 1/0018* (2013.01); *G07G 1/01* (2013.01); *G09G 2300/02* (2013.01); *G09G 2330/022* (2013.01); *G09G 2370/02* (2013.01); *G09G 2370/16* (2013.01)

(58) Field of Classification Search
CPC ...... G06Q 20/22; G06Q 20/30; G06F 3/1431; G07G 1/0018; G07G 1/01; G09G 2300/02; G09G 2330/022; G09G 2370/02; G09G 2370/16
See application file for complete search history.

(56) References Cited

U.S. PATENT DOCUMENTS

| | | | |
|---|---|---|---|
| 10,078,348 B1* | 9/2018 | Xu | G06F 1/1641 |
| 2014/0260424 A1* | 9/2014 | Warren | A44C 17/0233 63/1.13 |
| 2019/0014242 A1* | 1/2019 | Piekarski | H04N 5/2252 |

* cited by examiner

*Primary Examiner* — Patrick N Edouard
*Assistant Examiner* — Eboni N Giles (57) ABSTRACT

A double screen apparatus includes a frame housing, a first screen, a second screen, an audio output device, a first data port, a second data port, a controller, and a power supply unit. The first screen and the second screen are perimetrically mounted within the frame housing. The audio output device that emits audio data and the first and second data port that exchange audio and video data are integrated onto the frame housing. The controller controls the first screen, the second screen, the audio output device, the first data port, and the second data port so that controller can optimize the functionality of the double screen apparatus. The first screen, the second screen, the audio output device, the first data port, and the second data port are electronically connected to the controller and electrically connected to the power supply unit that supplies a flow of direct current.

4 Claims, 7 Drawing Sheets

DOUBLE SCREEN APPARATUS

The current application claims a priority to the U.S. Provisional Patent application Ser. No. 62/543,138 filed on Aug. 9, 2017.

FIELD OF THE INVENTION

The present invention relates generally to display screen devices. More particularly the present invention is a double screen apparatus that includes a first display screen and a second display screen, which are positioned within a single housing. The present invention includes a plurality of ancillary devices that provide different functionalities during the usage of the present invention.

BACKGROUND OF THE INVENTION

The same method for retail purchases has been used a long period of time. The method involves the user being displayed a list of items the user has purchased and being a given a physical receipt. The client and the cashier are not able to view the same display screen at the same time and the cashier is not able to focus on other work while the client is purchasing his or her items. Additionally, a substantial amount of paper is used to print of the physical receipts give to the client. There is room for improvement for a faster, more user-friendly method for purchasing items along and a method which eliminates the need for physical receipts.

It is therefore an objective of the present invention to provide a double screen apparatus which includes a first display screen and a second display screen which are positioned within single housing. The present invention comprises a plurality of ancillary devices such as cameras to take a picture of a user's face for electronic receipts or similar and allows two different users to utilize the present invention for different purposes at the same time. In an exemplary usage of the present invention, a client can easily fill out information on the first display screen to be sent as an electronic receipt of his or her purchases. The cashier can easily aid the client with anything through the second display screen that is opposite of the first display screen. The cashier may also focus on other work while the client is filling out information and/or finalizing his or her payment. The present invention is also able to take a picture of the client or the product to validate his or her purchase information through a camera. The client information and photo are stored within the system memory or an external computing device to expedite the purchase process of the client's next visit.

DETAIL DESCRIPTIONS OF THE INVENTION

All illustrations of the drawings are for the purpose of describing selected versions of the present invention and are not intended to limit the scope of the present invention.

Figure 1:
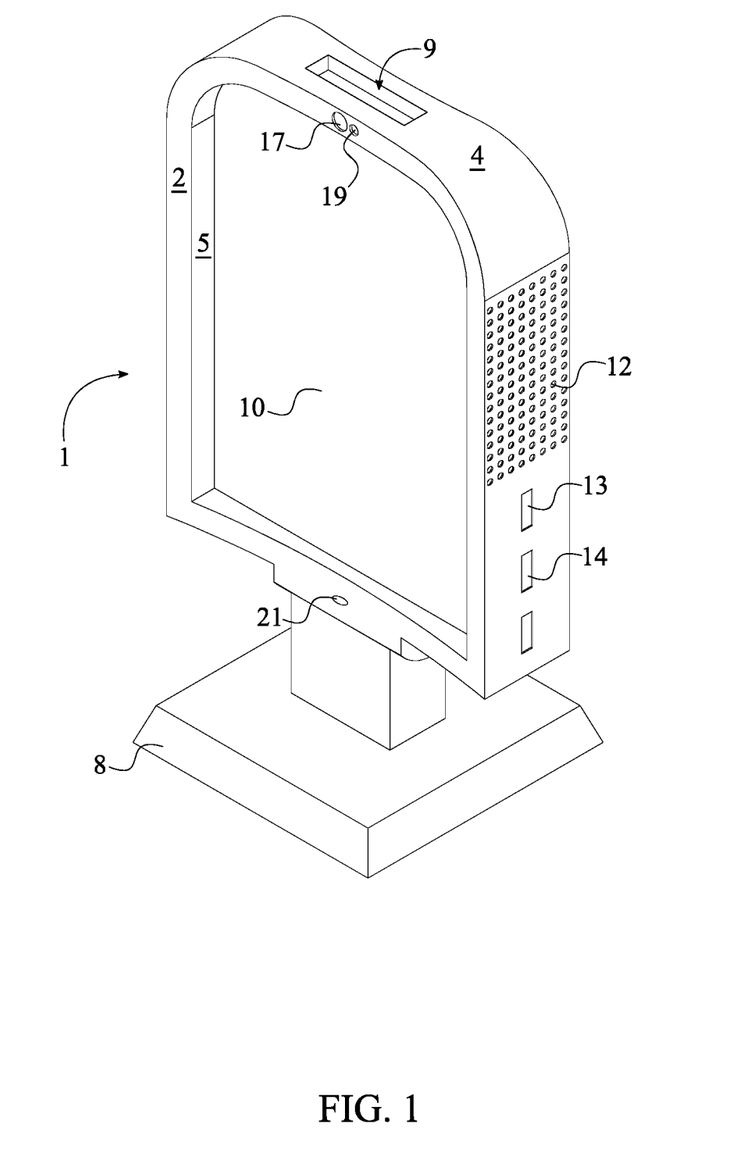
FIG. 1 is a perspective view of the present invention showing the first wall of the frame housing.
Figure 2:
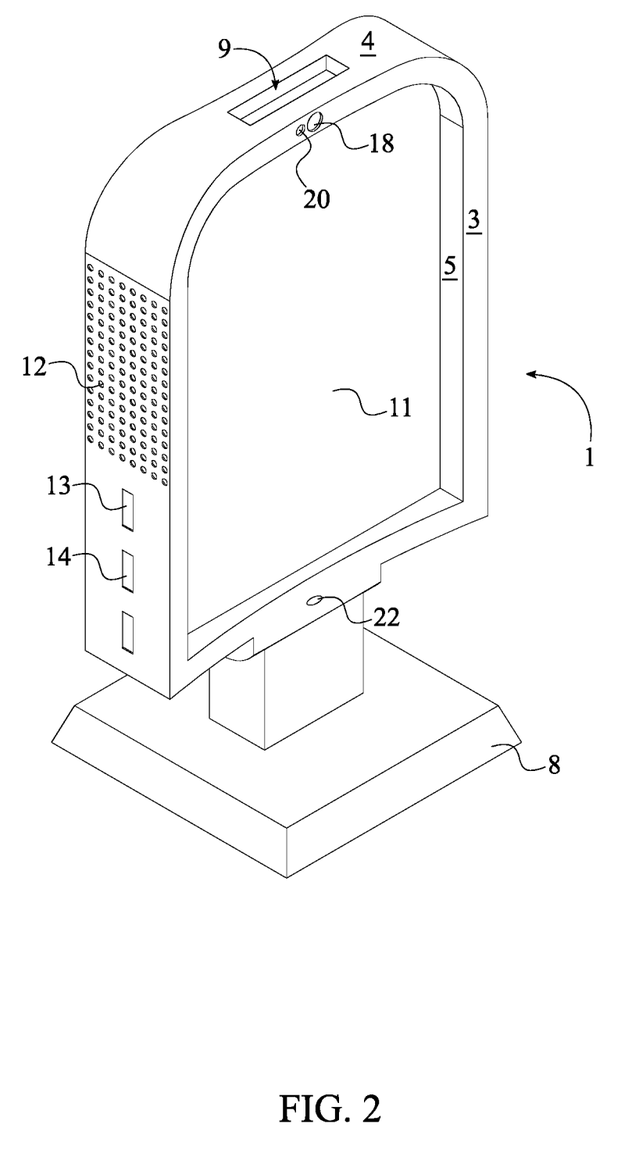
FIG. 2 is a perspective view of the present invention showing the second wall of the frame housing.
Figure 3:
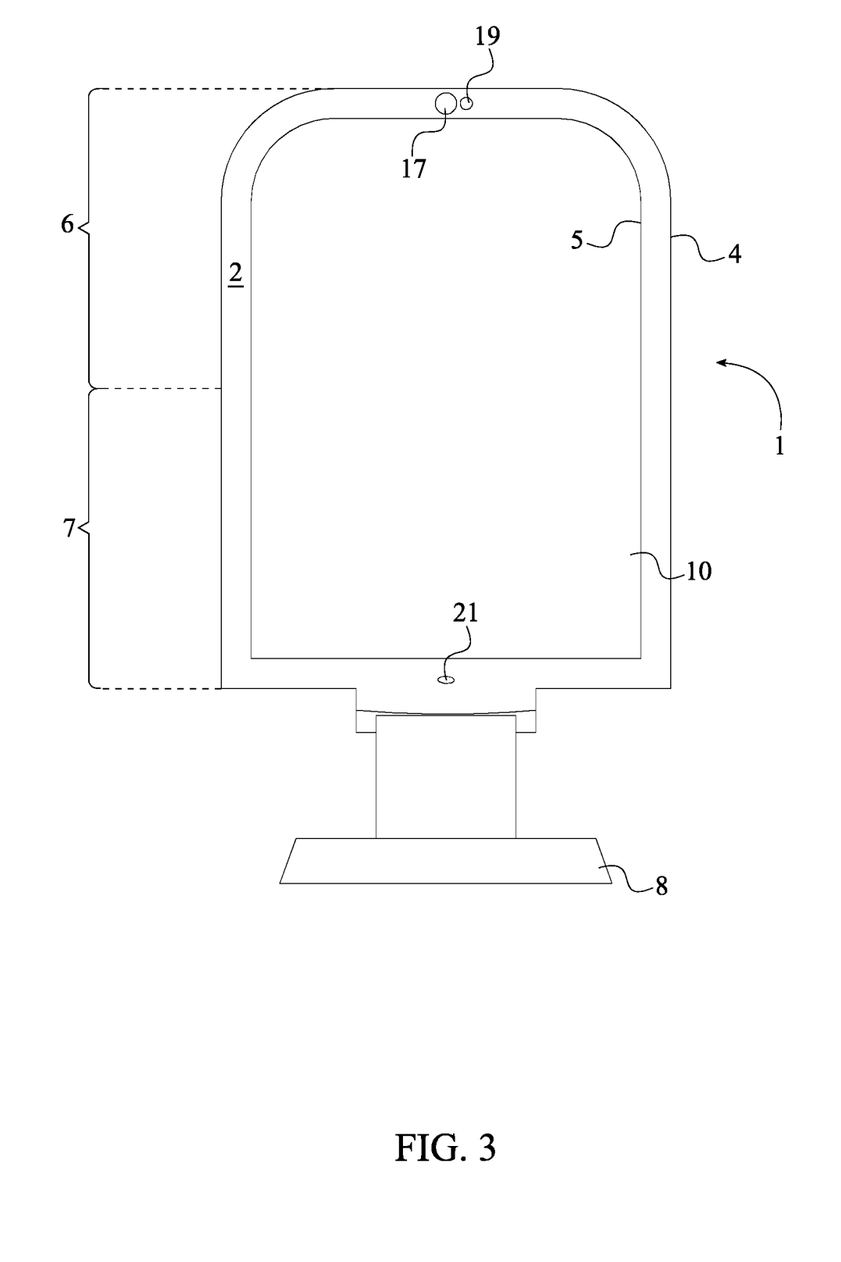
FIG. 3 is a front view of the present invention showing the top section and the bottom section of the frame housing.
Figure 4:
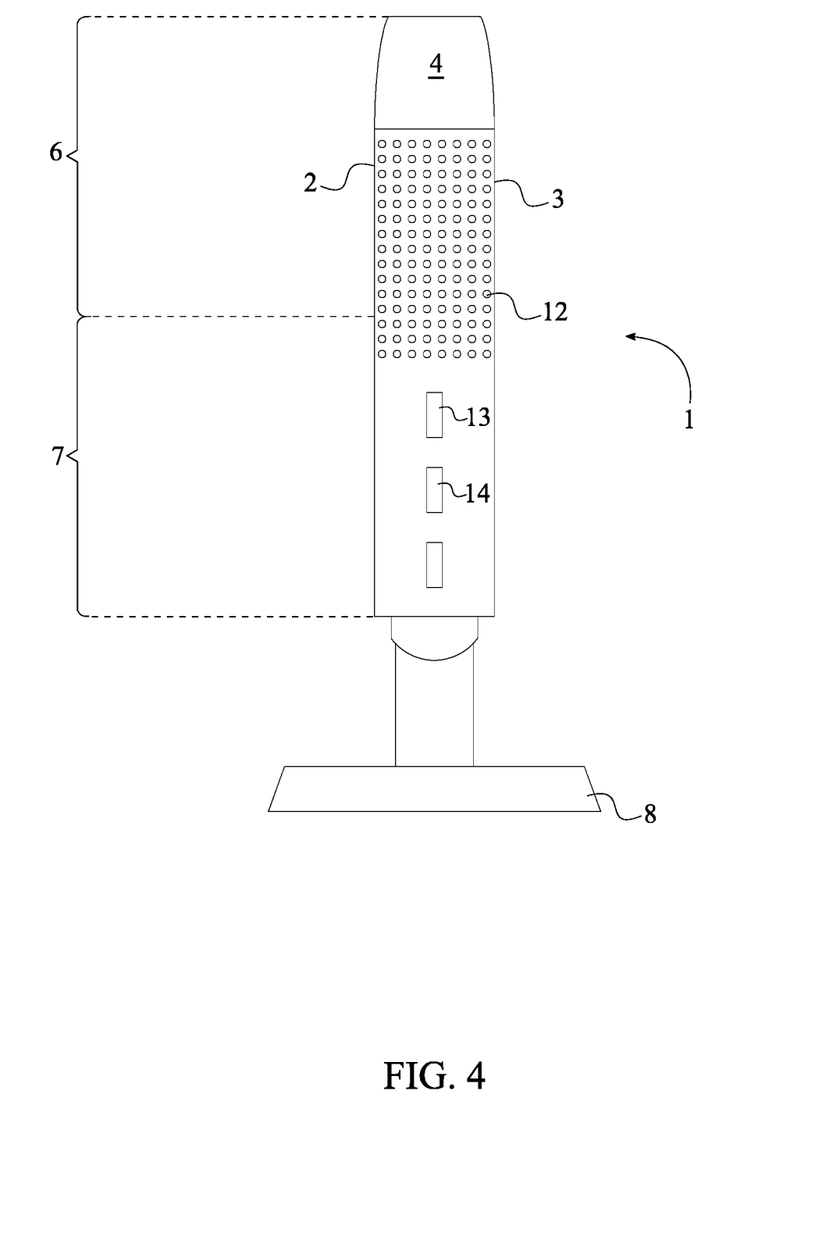
FIG. 4 is a side view of the present invention showing the top section and the bottom section of the frame housing.

The present invention is a double screen apparatus that portrays a dual screen computer monitor embodiment. The present invention can be communicably coupled with an external computing device which can include, but is not limited to, a personal computer, an electronic cash register, a smartphone, and an electronic tablet. The present invention comprises a frame housing 1, a first screen 10, a second screen 11, an audio output device 12, a first data port 13, a second data port 14, a controller 15, and a power supply unit 16 as shown in FIG. 1-2. In reference to the general configuration of the present invention, the first screen 10 and the second screen 11 are perimetrically mounted within the frame housing 1. The audio output device 12 that emits audio data and the first data port 13 and the second data port 14 that exchange audio and video data are integrated onto the frame housing 1. The controller 15 controls ancillary devices of the present invention, the first screen 10, the second screen 11, the audio output device 12, the first data port 13, and the second data port 14 so that controller 15 can optimize the functionality of the present invention. In reference to FIG. 6-7, the first screen 10, the second screen 11, the audio output device 12, the first data port 13, and the second data port 14, are electronically connected to the controller 15. The power supply unit 16 that supplies direct current to the present invention is electrically connected to the first screen 10, the second screen 11, the audio output device 12, the first data port 13, the second data port 14, and the controller 15.

In reference to FIG. 1-4, the frame housing 1 that functions as the base member of the present invention comprises a first wall 2, a second wall 3, an outer lateral wall 4, an inner lateral wall 5, a top section 6, and a bottom section 7. More specifically, the first wall 2 and the second wall 3 are perimetrically connected to each other by the outer lateral wall 4 and the inner lateral wall 5 thus resulting the first wall 2 and the second wall 3 to be oppositely positioned of each other across the outer lateral wall 4 and the inner lateral wall 5. Due to the configuration of the aforementioned walls, the frame housing 1 delineates a rigid hollow body to encloses the internal components of the present invention and to mount the first screen 10 and the second screen 11. More specifically, the first screen 10 and the second screen 11 are perimetrically mounted to the inner lateral wall 5. The first screen 10 is positioned adjacent to the first wall 2 and fully extended from the top section 6 to the bottom section 7. The second screen 11 is positioned adjacent to the second wall 3 and fully extended from the top section 6 to the bottom section 7. Furthermore, the first screen 10 and the second screen 11 are independently mounted to the frame housing 1 so that a removal one screen does not affect the configuration of the other screen. The audio output device 12, the first data port 13, and the second data port 14 are integrated onto the outer lateral wall 4 so that the first wall 2 and the second wall 3 can aesthetically improve the external appearance of the present invention.

The first screen 10 and the second screen 11 maintain similar functionality within the present invention other than the fact they are oppositely positioned of each other within the frame housing 1. In reference to FIG. 1-2, the first screen 10 and the second screen 11 may be any type of display screen such as an LED display screen, LCD display screen, curved display screen, or flat display screen that can display images. The first and second display screens may also be touch screen displays that allows users to navigate a displayed user interface through contact of the touch screens, such as a graphical user interface. The first screen 10 and second screen 11 may also comprise three-dimensional (3D) capability thus allowing users to access the 3D capabilities through 3D eyewear. In reference to FIG. 6-7, the first screen 10 and the second screen 11 are electrically connected to the power supply unit 16 so that the first screen 10 and the second screen 11 can be electrically powered from an external power source.

The audio output device 12, as shown in FIG. 1, a speaker within the preferred embodiment of the present invention. The speaker may be positioned a left-sidewall of the outer lateral wall 4, a right-sidewall of the outer lateral wall 4, or both the left-sidewall and the right-sidewall of the lateral wall to emit audio data that is related to the displayed information or the first screen 10 and the second screen 11. The first data port 13 and the second data port 14 allow a pair of data cables to be electronically connected to the present invention from one end so that the pair of data cables can electronically connect with an external computer system from the opposite end. The first data port 13 and the second data port 14 can include, but not limited to, serial digital interface (SDI) port, digital visual interface (DVI) port, high-definition multimedia interface (HDMI), and display interface port. Since the first data port 13 is electronically connected to the controller 15, a first data cable from the pair of data cables is able to transmit video data to the first screen 10 and audio data to the audio output device 12 through the controller 15. Similarly, due to the electronical connection of the second data port 14 and the controller 15, a second data cable from the pair of data cables is able to transmit video data to the second screen 11 and audio data to the audio output device 12 through the controller 15. In reference to FIG. 6, the audio output device 12, the first data port 13, and the second data port 14 are electrically connected to the power supply unit 16 so that the audio output device 12, the first data port 13, and the second data port 14 can be electrically powered from the external power source.

In reference to FIG. 1-2, the frame housing 1 further comprises a compartment 9 and a stand 8. The compartment 9 is a recessed area that is shaped and sized to receive and hold card-shaped objects such as business cards. The compartment 9 traverses into the outer lateral wall 4 from the top section 6 so that the business cards can be securely placed within. More specifically, the compartment 9 is positioned at the center of a top face of the outer lateral wall 4. In reference to FIG. 3-4, the stand 8 is terminally attached to the bottom section 7. The stand 8 is extended from the bottom section 7. More specifically, the stand 8 is positioned at the center of a bottom face of the outer lateral wall 4. The stand 8 may be any shape and size. The stand 8 may further comprise an adjustment mechanism allowing a user to adjust the angle and height of the present invention. The stand 8 can be removed from the outer lateral wall 4 when the user desires to utilize the present invention without the stand 8.

Figure 6:
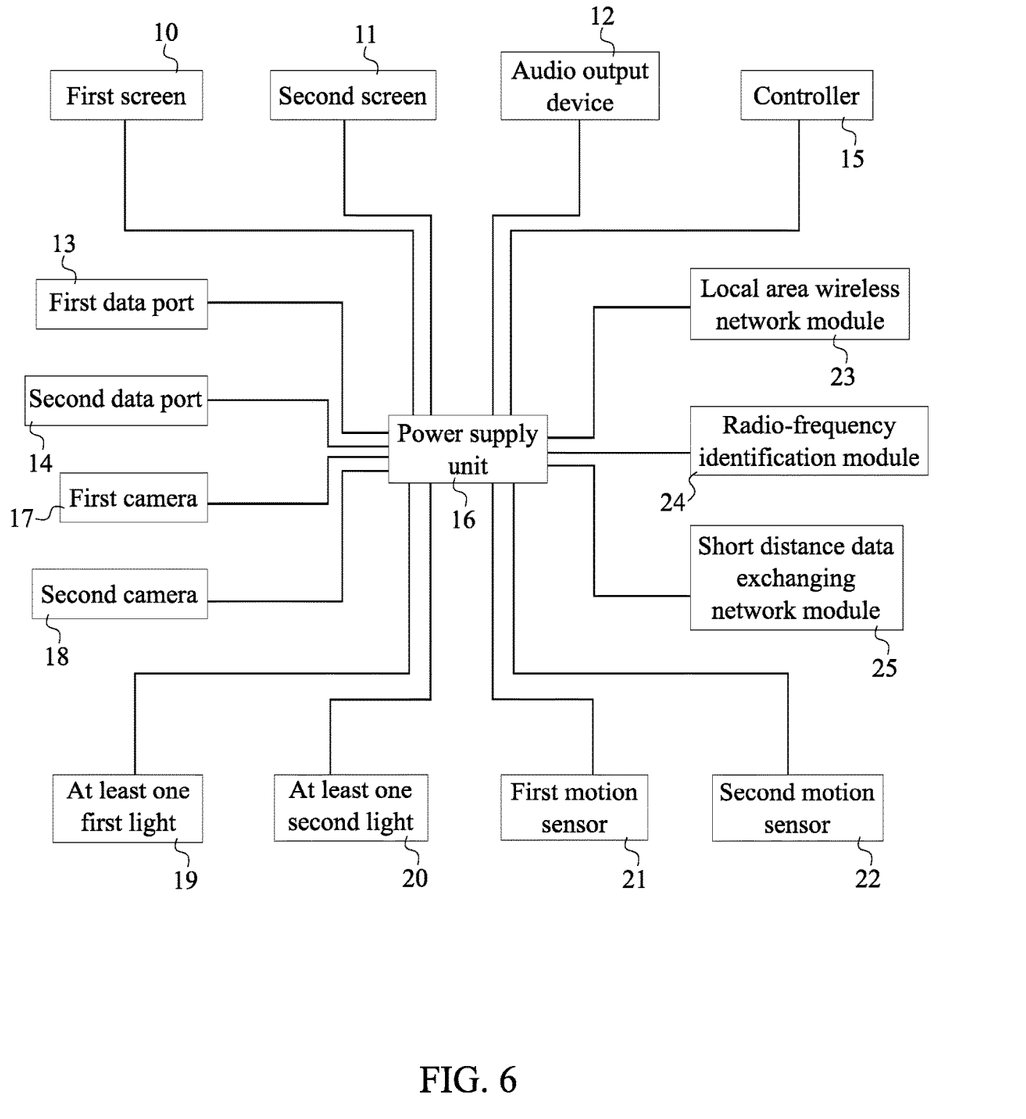
FIG. 6 is a schematic view showing the electrical connections of the present invention.
Figure 7:
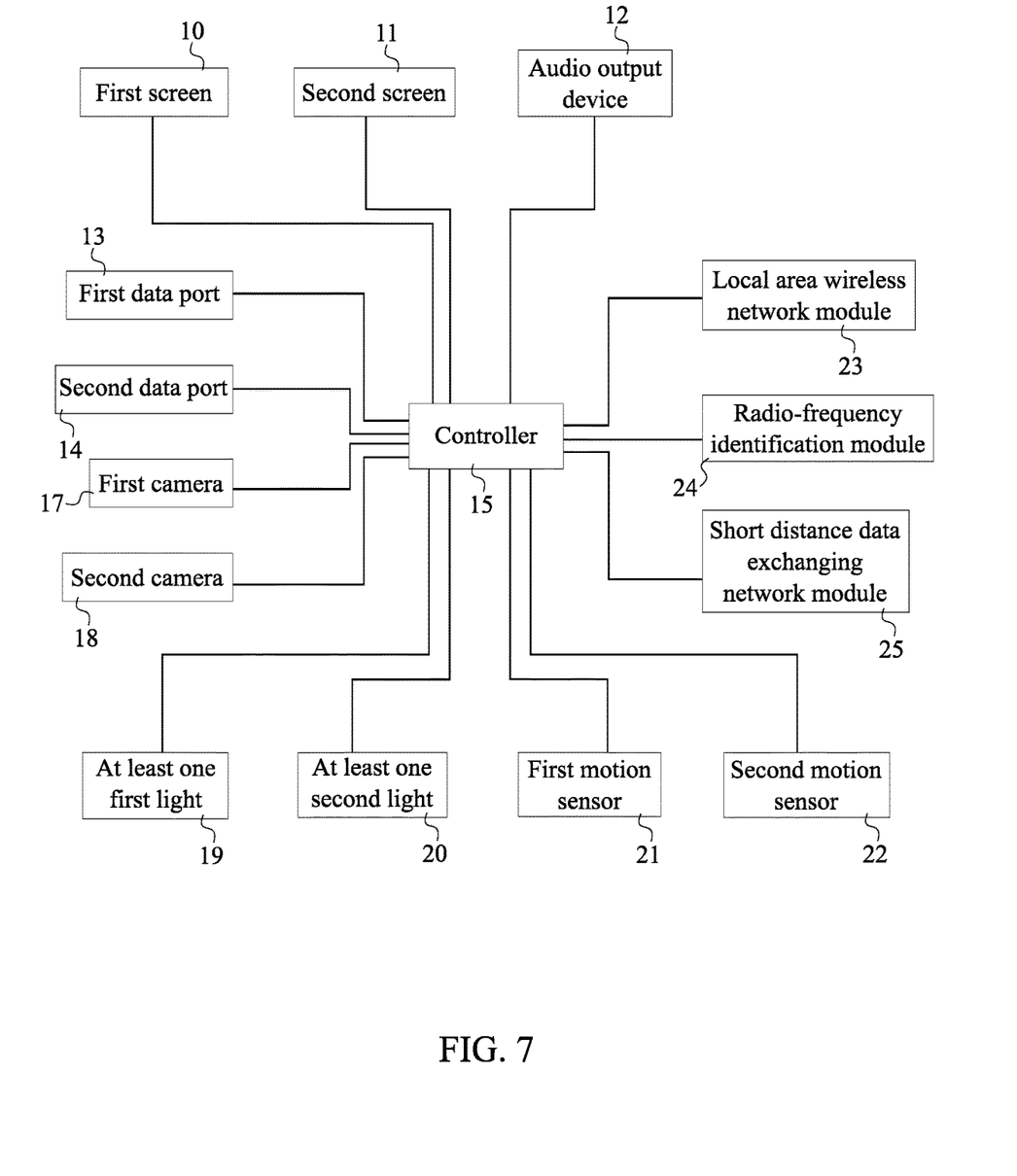
FIG. 7 is a schematic view showing the electronical connections of the present invention.

In reference to FIG. 1 and FIG. 6-7, the present invention further comprises a first camera 17 that is categorized as one of the ancillary devices within the present invention. The first camera 17 may be any type of camera that is able to capture images or video. The first camera 17 is positioned within the top section 6 so that the first camera 17 does not disturb the view of the first display screen. More specifically, the first camera 17 is integrated into the first wall 2 so that the first camera 17 and the first wall 2 orient towards the one side of the present invention. Furthermore, the first camera 17 is electronically connected to the controller 15 so that the controller 15 is able to execute any image or video data that is received through the first camera 17. The first camera 17 is electrically connected to the power supply unit 16, wherein the power supply unit 16 electrically powers the first camera 17.

In reference to FIG. 2 and FIG. 6-7, the present invention further comprises a second camera 18 that is categorized as one of the ancillary devices within the present invention. The second camera 18 may be any type of camera that is able to capture images or video. The second camera 18 is positioned within the top section 6 so that the second camera 18 does not disturb the view of the second display screen. More specifically, the second camera 18 is integrated into the second wall 3 so that the second camera 18 and the second wall 3 orient towards the one side of the present invention, opposite of the first camera 17. Furthermore, the second camera 18 is electronically connected to the controller 15 so that the controller 15 is able to execute any image or video data that is received through the second camera 18. The second camera 18 is electrically connected to the power supply unit 16, wherein the power supply unit 16 electrically powers the second camera 18.

In reference to FIG. 1 and FIG. 6-7, the present invention further comprises at least one first light 19 that is categorized as one of the ancillary devices within the present invention. The at least one first light 19 may be any type of illumination device that is able to provide lighting effects for the first camera 17. The at least one first light 19 is positioned within the top section 6 so that the at least one first light 19 does not disturb the view of the first display screen. More specifically, the at least one first light 19 is integrated into the first wall 2 so that the at least one first light 19 can be positioned adjacent to the first camera 17. Furthermore, the at least one first light 19 is electronically connected to the controller 15 so that the controller 15 is able to execute operation of the at least one first light 19 with respect to the operation of the first camera 17. The at least one first light 19 is electrically connected to the power supply unit 16, wherein the power supply unit 16 electrically powers the at least one first light 19.

In reference to FIG. 2 and FIG. 6-7, the present invention further comprises at least one second light 20 that is categorized as one of the ancillary devices within the present invention. The at least one second light 20 may be any type of illumination device that is able to provide lighting effects for the second camera 18. The at least one second light 20 is positioned within the top section 6 so that the at least one second light 20 does not disturb the view of the second display screen. More specifically, the at least one second light 20 is integrated into the second wall 3 so that the at least one second light 20 can be positioned adjacent to the second camera 18. Furthermore, the at least one second light 20 is electronically connected to the controller 15 so that the controller 15 is able to execute operation of the at least one second light 20 with respect to the operation of the second camera 18. The at least one second light 20 is electrically connected to the power supply unit 16, wherein the power supply unit 16 electrically powers the at least one second light 20.

In reference to FIG. 1 and FIG. 6-7, the present invention further comprises a first motion sensor 21, categorized as one of the ancillary device, to track motion so that the present invention can switch in between an idle stage and an active stage. More specifically, the first motion sensor 21 is integrated into the first wall 2 so that the first motion sensor 21 is able to correspond with the first screen 10. More specifically, the first motion sensor 21 is electronically connected to the controller 15 so that the first motion sensor 21 can control the idle stage and the active stage of the first screen 10 to save power. The first motion sensor 21 is electrically connected to the power supply unit 16, wherein the power supply unit 16 electrically powers the first motion sensor 21 thus optimizing the performance of the present invention with respect to the first screen 10.

In reference to FIG. 2 and FIG. 6-7, the present invention further comprises a second motion sensor 22, categorized as one of the ancillary device, to track motion so that the present invention can switch in between an idle stage and an active stage. More specifically, the second motion sensor 22 is integrated into the second wall 3 so that the second motion sensor 22 is able to correspond with the second screen 11. More specifically, the second motion sensor 22 is electronically connected to the controller 15 so that the second motion sensor 22 can control the idle stage and the active stage of the second screen 11 to save power. The second motion sensor 22 is electrically connected to the power supply unit 16, wherein the power supply unit 16 electrically powers the second motion sensor 22 thus optimizing the performance of the present invention with respect to the second screen 11.

Figure 5:
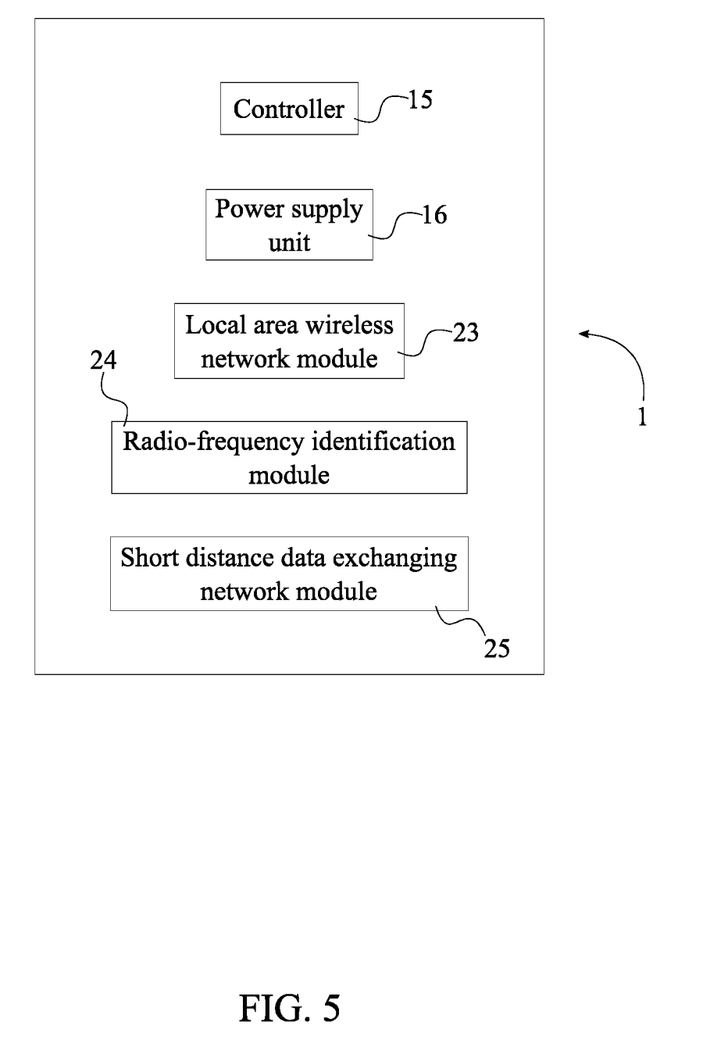
FIG. 5 is a schematic view showing the internal positioning of the controller, the power supply unit, the local area wireless network module, the radio-frequency identification module, and the short distance data exchanging network module within the frame housing of the present invention.

In reference to the FIG. 5-7, the present invention further comprises a local area wireless network module 23, categorized as one of the ancillary device, so that the present invention is able to wirelessly communicate with wireless capable devices such as smartphones, electronic tables, and laptops. The wireless connection between the present invention and the wireless capable devices are essential to some of the transactions and user interactions that are implemented through the present invention. For example, when a client needs access internet, the present invention can grant that access through the local area wireless network module 23. The local area wireless network module 23 is mounted within the frame housing 1 to maintain the aesthetic appearance of the present invention. The local area wireless network module 23 is electronically connected to the controller 15 so that the local area wireless network module 23 can collect and process data or provide wireless service through the controller 15. The local area wireless network module 23 is electrically connected to the power supply unit 16, wherein the power supply unit 16 electrically powers the local area wireless network module 23 within the present invention.

In reference to the FIG. 5-7, the present invention further comprises a short distance data exchanging network module 25, categorized as one of the ancillary device, so that the present invention is able to wirelessly communicate with wireless capable devices such as smartphones, electronic tables, and laptops. The wireless connection between the present invention and the wireless capable devices are essential to some of the transactions and user interactions that are implemented through the present invention. For example, when a client needs upload a document to the present invention, the uploading process can be completed through the short distance data exchanging network module 25. The short distance data exchanging network module 25 is mounted within the frame housing 1 to maintain the aesthetic appearance of the present invention. The short distance data exchanging network module 25 is electronically connected to the controller 15 so that the short distance data exchanging network module 25 can collect and process data through the controller 15. The short distance data exchanging network module 25 is electrically connected to the power supply unit 16, wherein the power supply unit 16 electrically powers the short distance data exchanging network module 25 within the present invention.

In reference to the FIG. 5-7, the present invention further comprises a radio-frequency identification (RFID) module 24, categorized as one of the ancillary device, so that the present invention is able to wirelessly communicate with wireless capable devices such as RFID tags, RFID scan guns, and RFID cards. The wireless connection between the present invention and the wireless capable devices are essential to some of the transactions and user interactions that are implemented through the present invention. For example, when an employee need to scan a paper-based coupon, the employee can use a RFID scan gun to scan in the coupon to the present invention. The RFID module 24 is mounted within the frame housing 1 to maintain the aesthetic appearance of the present invention. The RFID module 24 is electronically connected to the controller 15 so that collected data of the RFID module 24 can be processed through the controller 15. The RFID module 24 is electrically connected to the power supply unit 16, wherein the power supply unit 16 electrically powers the RFID module 24 within the present invention.

In another embodiment of the present invention, the inside of the frame housing 1 further comprises a computing processer unit, a circuit board, a graphics processor unit, a plurality of memory storage devices, and a cooling system. In this embodiment, the present invention functions as a stand-alone computing system and does not electronically connected to the external computing system. The computing processor unit is electronically connected to the circuit board. The graphics processor unit is electronically connected to the circuit board. The plurality of memory storage devices is electronically connected to the circuit board. The plurality of memory storage devices comprises a RAM memory device, a HDD device, and a SSD device. The plurality of memory storage devices allows the user to store information. The computing processor unit allows the present invention to run an operating system such as Windows, Linux, and/or MAC OS. Optionally, the frame housing 1 may comprise a card reader device. The card reader device may be electronically connected or attached anywhere to the frame housing 1. The card reader device allows users to swipe/insert their credit/debit cards to make purchases.

In an exemplary usage of the present invention, a client can easily fill out information on the first screen 10 to be sent as an electronic receipt of his or her purchases. The cashier can easily aid the client with anything through the second screen 11 that is opposite of the first screen 10. The cashier may also focus on other work while the client is filling out information and/or finalizing his or her payment. The present invention is also able to take a picture of the client or the product to validate his or her purchase information through the first camera 17. The client information and photo are stored within the system memory or the external computing device to expedite the purchase process of the client's next visit.

Although the invention has been explained in relation to its preferred embodiment, it is to be understood that many other possible modifications and variations can be made without departing from the spirit and scope of the invention as hereinafter claimed.

What is claimed is:

1. A double screen apparatus comprising:
a frame housing;
a first screen;
a second screen;
an audio output device;
a first data port;
a second data port;
a controller;
a power supply unit;
a first camera;
a second camera;
at least one first light;
at least one second light;
a first motion sensor;
a second motion sensor;
the frame housing comprising a first wall, a second wall, an outer lateral wall, an inner lateral wall, a top section, a bottom section, a compartment and a stand;
the first wall and the second wall being perimetrically connected to each other by the outer lateral wall and the inner lateral wall;
the first wall and the second wall being oppositely positioned of each other across the outer lateral wall and the inner lateral wall;
the compartment traversing into the outer lateral wall from the top section;
the stand being terminally attached to the bottom section;
the compartment and the stand being oppositely positioned of each other about the frame housing;
the first screen and the second screen being perimetrically mounted to the inner lateral wall;
the first screen being positioned adjacent to the first wall;
the second screen being positioned adjacent to the second wall;
the audio output device, the first data port and the second data port being integrated onto the outer lateral wall;
the controller being mounted within the frame housing;
the first camera being integrated into the first wall;
the first camera being positioned within the top section;
the second camera being integrated into the second wall;
the second camera being positioned within the top section;
the at least one first light being integrated into the first wall;
the at least one first light being positioned within the top section;
the at least one second light being integrated into the second wall;
the at least one second light being positioned within the top section;
the first motion sensor being integrated into the first wall;
the second motion sensor being integrated into the second wall;
the first motion sensor being positioned within the bottom section;
the second motion sensor being positioned within the bottom section;
the first motion sensor and the first camera being oppositely positioned to each other across the first screen;
the second motion sensor and the second camera being oppositely positioned to each other across the second screen;
the first screen, the second screen, the audio output device, the first data port, the second data port, the first camera, the second camera, the at least one first light, the at least one second light, the first motion sensor and the second motion sensor being electronically connected to the controller; and
the first screen, the second screen, the audio output device, the first data port, the second data port, the first camera, the second camera, the at least one first light, the at least one second light, the first motion sensor, the second motion sensor and the controller being electrically connected to the power supply unit.

2. The double screen apparatus as claimed in claim 1 comprising:
a local area wireless network module;
the local area wireless network module being mounted within the frame housing;
the local area wireless network module being electronically connected to the controller; and
the local area wireless network module being electrically connected to the power supply unit.

3. The double screen apparatus as claimed in claim 1 comprising:
a radio-frequency identification (RFID) module;
the RFID module being mounted within the frame housing;
the RFID module being electronically connected to the controller; and
the RFID module being electrically connected to the power supply unit.

4. The double screen apparatus as claimed in claim 1 comprising:
a short distance data exchanging network module;
the short distance data exchanging network module being mounted within the frame housing;
the short distance data exchanging network module being electronically connected to the controller; and
the short distance data exchanging network module being electrically connected to the power supply unit.

* * * * *